United States Patent [19]
Shinozaki et al.

[11] 3,988,776
[45] Oct. 26, 1976

[54] SYSTEM FOR CONTROLLING EXCESSIVE INCIDENT LIGHT IN COLOR TELEVISION CAMERAS

[75] Inventors: Takashi Shinozaki, Yokohama; Seigo Kokufukata, Tokyo; Shintaro Nakagaki, Yokohama; Tetsushi Satoh, Kamakura, all of Japan

[73] Assignee: Victor Company of Japan, Limited, Yokohama, Japan

[22] Filed: Nov. 26, 1974

[21] Appl. No.: 527,371

[30] Foreign Application Priority Data
Nov. 30, 1973 Japan................................48-135066
Nov. 30, 1973 Japan............................ 48-135067
June 24, 1974 Japan........................ 49-737131[U]
July 22, 1974 Japan.......................... 49-85982[U]
July 23, 1974 Japan.......................... 49-86828[U]

[52] U.S. Cl.................................... 358/41; 358/44; 178/7.2; 178/DIG. 29
[51] Int. Cl.²..................... H04N 9/07; H04N 5/193
[58] Field of Search............. 178/DIG. 29, 7.92, 7.2; 358/41, 55, 43, 44, 50, 52, 55

[56] References Cited
UNITED STATES PATENTS
2,698,356 12/1954 Roos........................... 178/DIG. 29
3,086,077 4/1963 Mayer.......................... 178/DIG. 29
3,284,566 11/1966 James et al. .......................... 358/55
3,691,302 9/1972 Gaerele et al. ............... 178/DIG. 29

*Primary Examiner*—John C. Martin

[57] ABSTRACT

A color television camera has a camera tube for receiving incident light from an image pickup object. It produces output signals representing an image of the object. The signal level varies in accordance with the incident light quantity assuming a constant target voltage. The system disposes of excessive incident light quantity. A control circuit lowers the voltage impressed on the target of the camera tube and controls the output signal level of the camera tube at a constant value, when the incident light quantity to the camera tube becomes excessive and exceeds a first predetermined light quantity. An indicator indicates when the incident light quantity to the camera tube becomes excessive, exceeding a second predetermined light quantity which is greater than the first predetermined light quantity. The resulting pickup picture deteriorates when the light exceeds a practical allowable limit despite the operation of the control circuit. An iris mechanism is manually operable to reduce the incident light quantity when the indicator indicates that the incident light quantity is in excess of the second predetermined light quantity.

7 Claims, 13 Drawing Figures

SYSTEM FOR CONTROLLING EXCESSIVE INCIDENT LIGHT IN COLOR TELEVISION CAMERAS

BACKGROUND OF THE INVENTION

This invention relates generally to a color television camera and to a system therein for controlling excessive incident light. More particularly, the invention relates to an excessive incident light control system in which an automatic compensation system maintains a constant output signal level from the camera tube of a color television camera. The system changes the operational point of the camera tube only when there is an excessive amount of incident light, with respect to the camera tube. The system is used up to a limit beyond which a television picture of good quality cannot be practically obtained. The iris aperture of the camera optical system is manually adjusted when a detecting means indicates that this usable limit has been. Thus, the camera pickup operates over a wide range of allowable incident light quantity.

In general, when an excessive amount of light is incident to the camera tube, or an image pickup tube, of a color television camera (hereinafter called simply "color camera") the picture quality of the television picture deteriorates. Accordingly, there have been various systems in the prior art for substantially controlling the amount of light incident to the camera tube of a color camera in order to pick up television pictures of good quality.

Representative examples of these control systems are: (1) the so-called auto-iris system in which an aperture-varying or iris mechanism provided within the optical system of the color camera is adjusted by an automatic control; (2) a system in which an iris mechanism within the optical system of the color camera is manually adjusted; and (3) the automatic gain control system (AGC system) in which, the beam current of the camera tube is left at a large value. The range of correspondence between the amount of incident light and the signal output of the camera tube (i.e., dynamic range) is large. The output signal of the camera tube is constant. These systems have been accompanied by the following problems.

The auto-iris system (1) has required a long response time since its iris mechanism is automatically controlled in a mechanical manner by a means, such as a servomotor. It is necessary to provide means for clipping signals, such as a nonlinear element outside of the automatic control loop. The price of the apparatus is very high.

While the above mentioned control system (2) is inexpensive and is therefore suitable for color cameras of a simple type, the continual manual adjustment of the iris mechanism is troublesome, and the control manipulation of the camera becomes complex.

In the AGC system (3), the uniformity in the resulting picture of the output modulated chrominance signal, of the camera tube, deteriorates in proportion to the beam current. Consequently, it has been possible to control excessive amounts of incident light of a certain magnitude in the case of a camera tube of the electromagnetic focussing-electromagnetic deflection type. However, the maximum usable beam current, in the case of a camera tube of the electrostatic focussing-electromagnetic deflection type, has been limited to approximately twice the normal beam current.

Accordingly, it is contemplated in the present invention to overcome the above described problems encountered in the prior art systems. The invention uses an automatic level control system (hereinafter referred to as ALC system), which has heretofore been considered to be inapplicable in a color camera. There are automatic control means whereby the output signal level becomes constant even for excessive amounts of incident light. Indicating means indicate the usable limit point of the ALC system. The iris aperture of the camera lens system can be manually adjusted upon detection of the usable limit point, as indicated by the indicating means.

The ALC system is one wherein the target voltage of the camera tube is varied and the sensitivity thereof is adjusted by an electrical circuit. The circuit causes the output signal level of the camera tube to be constant, irrespective of variation in the incident light quantity entering the camera tube. This ALC system is being used in monochrome cameras.

In a color camera, it is necessary to hold constant the target voltage of the camera tube for preventing black level clamping (set up) and shading and preventing variation of the gamma ($\gamma$) characteristic of the camera tube output signal. For this reason, it has heretofore been considered impossible to apply the above mentioned ALC system, in which the target voltage is varied, to a color camera, and it has not been realized in practice.

We have found, however, that an ALC system can be applied in a color camera provided that the following three conditions are satisfied.

First, the target voltage of the camera must not be raised above a level (hereinafter referred to as the standard image pickup level) in which the sensitivity is such that the target voltage is raised so high the shading and temperature characteristic do not present problems in practice. That is, as the target voltage is raised and the sensitivity of the camera tube increases, shading is produced until the resulting television picture becomes practically unbearable. Accordingly, the target voltage is held constant for incident light quantities which are less than an excessive incident light quantity. The target voltage is decreased and the sensitivity is decreased by means of the ALC system only for excessive incident light quantity.

Second, the limiting range is at the point where a picture of good quality in practice cannot be obtained because of white balance deviation due to nonuniformity of the color signal components red (R), green (G), and blue (B). This limit is caused when the gamma characteristic, of the output signal of the camera tube, used in a simple type color camera, is not 1 (unity). A variation of set up is due to variation in shading in the range of practical use of the ALC system.

Third, means are provided so that the camera operator can judge the range of applicability of the ALC system. This means is necessary for the camera operator when the range, of practical use, of the ALC system is exceeded. The operator must detect when the range is exceeded and manually control the lens aperture of the camera optical system thereby the adjust the incident light quantity to a suitable magnitude.

SUMMARY OF THE INVENTION

Accordingly, it is a general object of the present invention to provide a novel and useful means for eliminating the effects of excessive incident light in a color television camera, in which system the aforedescribed problems of the prior art have been solved.

A specific object of the invention is to provide a system as stated above in which the three conditions set forth above are satisfied, and an ALC system is applied in the color television camera.

Another object of the invention is to provide a system of the above stated character in which the ALC system reduces the target voltage of the camera tube for excessive amounts of incident light.

Still another object of the invention is to maintain a constant output signal level of a preamplifier when the amount of incident light is within a range in which the deterioration of the picture quality is practically allowable. When large amounts of incident light exceed this limit, such excess is detected by a detecting means, whereupon the iris is manipulated to reduce the excessive amount of incident light to a suitable value for the camera tube.

In accordance with the system of the present invention, the unadjusted range of the lens iris mechanism of the camera tube (with respect to excessive incident light quantity) can be expanded. Since the dynamic range of the amplifier in the stage following the preamplifier above a necessary range is not necessary because of the ALC system, the system can be made very inexpensively. Furthermore, since the flow of a beam current greater than a necessary value is not necessary, the modulation degree characteristic does not deteriorate. The attainment of uniformity of the picture is facilitated. In addition, there is less coloring of the highlight parts in comparison with known systems.

Other objects and further features of the invention will be apparent from the following detailed description with respect to preferred embodiments of the invention when read in conjunction with the accompanying drawings.

DETAILED DESCRIPTION

Figure 1:
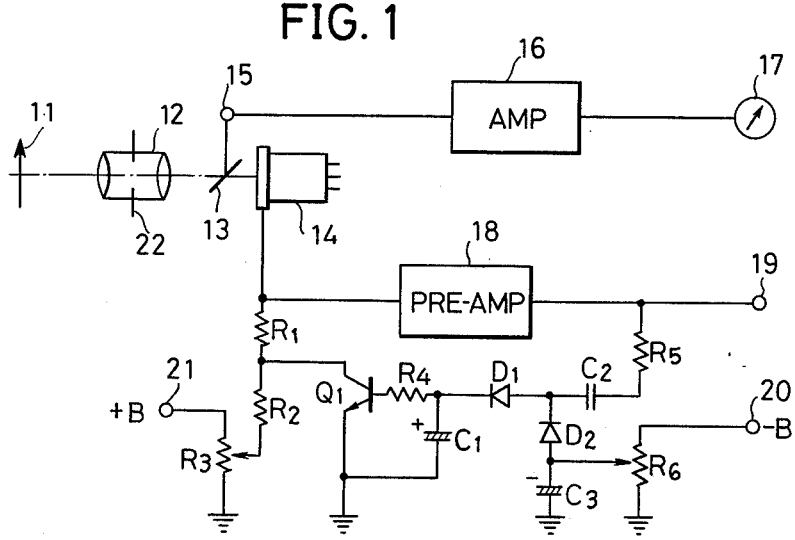
FIG. 1 is a circuit diagram showing a first embodiment of a color camera for reducing excessive amounts of incident light according to the invention.

In the first embodiment of the system of the invention as shown in FIG. 1, light from an object 11 is picked up and passed through a camera lens system 12. A half mirror 13 divides the light path and projects it respectively to a camera tube 14 of a color camera and a photoelectric transducer 15. Within the camera lens system 12, comprising a plurality of lenses, a manually operated iris mechanism 22 is controllably manipulated as described hereinafter.

The photoelectric transducer 15 converts the incident light from the camera object 11 into an electrical signal in accordance with the quantity of that incident light. This output electrical signal is amplified by an amplifier 16 and is then supplied to a meter 17 provided within a viewfinder of the color camera. The meter 17 has a pointer which indicates a value corresponding to the amount of the above mentioned incident light.

In accordance with the incident light, the camera tube 14 produces an output camera signal, which is fed to a preamplifier 18. The preamplifier 18 thereby produces an output signal, which is conducted to an output terminal 19, on the one hand, to be led out as a video signal and is fed, on the other hand, by way of a resistor R5 to a rectification circuit comprising capacitors C1 and C2 and diodes D1 and D2, where it is peak rectified. The signal thus rectified is thereafter fed by way of a resistor R4 to the base of a transistor Q1. This transistor Q1 becomes conductive only when the voltage of the output signal of the preamplifier 18 is higher than the voltage being applied to the diode D2 by way of a variable resistor R6 connected between a DC voltage —B supply terminal 20 and ground.

If a normal amount of light is incident to the camera tube 14, i.e. below a first predetermined light quantity $l_1$, the voltage of the output signal of the preamplifier 18 is lower than the voltage supplied by way of the variable resistor R6 to the diode D2. For this reason, the transistor Q1 remains nonconductive. At this time, the target voltage of the camera tube 14 is held at a constant value E1 by a constant voltage supplied to the camera tube 14 by way of a variable resistor R3 connected between a DC voltage +B supply terminal 21 and ground, and by way of resistors R2 and R1. The value of the target voltage E1 in the standard pickup state, as the aforementioned first condition, is set by the variable resistor R3.

Assume that the quantity of incident light entering the camera tube 14 increases to a magnitude such that the standard pickup state cannot be sustained. That is, it becomes greater than the first predetermined light quantity $l_1$. The output signal level of the preamplifier 18 and increases with the increase in the incident light quantity, and becomes higher than the voltage set by the variable resistor R6. Accordingly, the output signal of the preamplifier 18 is peak rectified by the capacitors C2 and C1 and the diodes D2 and D1. Then the signal is supplied by way of the resistor R4 to the base of the transistor Q1, which is thereby rendered conductive.

Consequently, the current which is supplied through the variable resistor R3 and resistor R2 is divided into a current which flows through the resistor R1 to the camera tube 14. A current flows through the collector and emitter of the transistor Q1 in the conductive state to the ground side. As a consequence, the target voltage of the camera tube 14 is decreased to a value which is lower than the target voltage E1 at the time of standard image pickup state. As a result, the output signal level of the preamplifier 18 is maintained constant. Together with the increase in the incident light quantity entering the camera tube 14, the voltage impressed on the base of the transistor Q1 increases. The collector current increases, whereby the target voltage of the camera decreases substantially linearly.

Figure 2A:
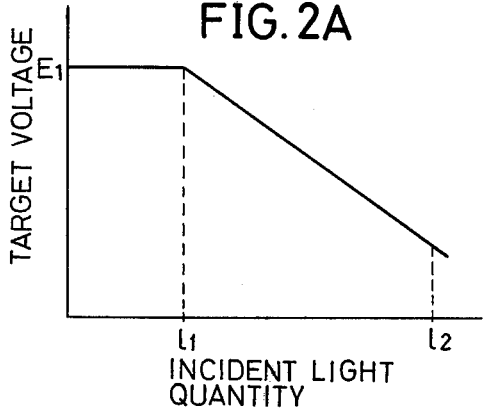
FIGS. 2A and 2B are graphs respectively indicating variations of target voltage and output level of a preamplifier, with incident light quantity, for a description of the operation of the circuit illustrated in FIG. 1.

The relationship between the above mentioned incident light quantity and the target voltage of the camera tube 14 is indicated in FIG. 2A. As mentioned above, if the incident light quantity is less than the limit light quantity $l1$, the transistor Q1 is nonconductive. The target voltage is a constant value (E1). However, when the incident light quantity is greater than the limit light quantity $l1$, the transistor Q1 becomes conductive. As the incident light quantity increases, the target voltage decreases substantially linearly. Accordingly, the output signal level of the preamplifier 18 increases with increase in the incident light quantity if the incident light quantity is less than the limit light quantity $l1$. It is sustained at a constant value (V1) by the above mentioned ALC operation when the incident light quantity is greater than the limit light quantity $l1$.

However, when the above described ALC operation is being carried out, if the incident light quantity becomes even more excessive, the color signal components of red, green, and blue become nonuniform because the gamma characteristic of the output signal of a camera tube used in a simple type color camera is not 1 (unity). This nonuniformity gives rise to white balance deviation. As a result of this white balance deviation and the variation of the set-up due to variation of shading, it becomes practically impossible to obtain a picture of good quality. Accordingly, using the present invention, there is means by which the camera operator can detect an increase in the incident light quantity which exceeds a second predetermined light quantity $l2$, corresponding to the limit within which a practically good quality picture can be obtained by the above described ALC system, as described below.

The incident light is divided by the half mirror 13 and part is transmitted to the photoelectric transducer 15 and converted into an electrical signal having a level corresponding to the incident light quantity. The output signal of the photoelectric transducer 15 is amplified by the amplifier 16 and is then supplied to operate the meter 17 pointer. Accordingly, the pointer of the meter 17 indicates the quantity of incident light entering the camera tube 14. The calibrated dial of the meter 17 bears markings which indicate the range of the pointer swing responsive to the quantity of incident light entering the camera tube 14. The markings indicate when the pointer exceeds the second predetermined light quantity $l2$ corresponding to the above mentioned practical limit of the ALC system.

Accordingly, when the camera operator observes that the pointer of the meter 17 has entered into the above mentioned indication range, he manually manipulates the iris mechanism to reduce the incident light falling upon the camera tube 14 up to a degree at which a picture of practically good quality can be obtained even with the ALC system. That is, the incident light quantity will be less than the above mentioned light quantity $l2$. By this control procedure, the color camera can always be operated to pick up the object 11 with appropriate incident light quantity.

In this connection, the predetermined light quantity $l1$ can be attained up to the limit to which the aforementioned standard image can be picked up. This signal differs with the kind of the camera tube, but it is ordinarily of the order of 1,100 luxes. Furthermore, the predetermined light quantity $l2$ is of the limit up to which a practically good picture can be obtained, even with the use of the ALC circuit. The limit is a value such that, for example, the hue becomes $\pm 5°$ or more, and the degree of saturation becomes 3 dB or higher.

Figure 3:
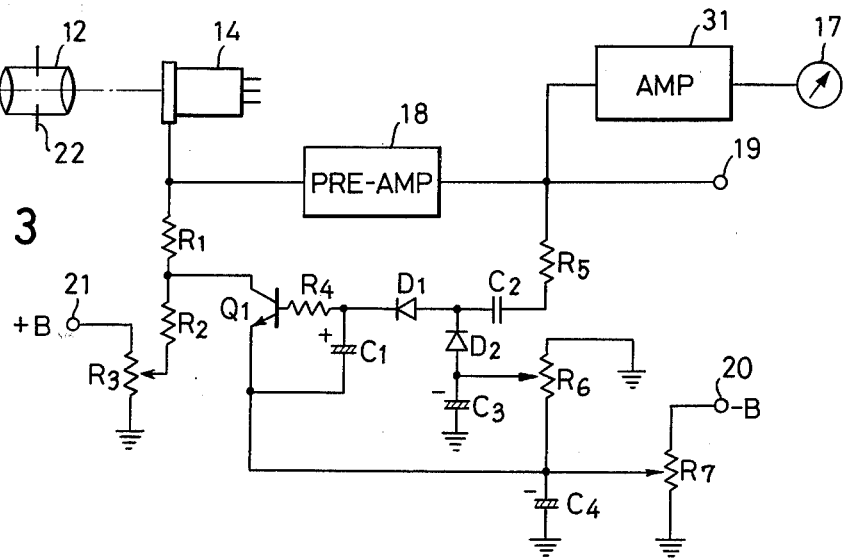
FIG. 3 is a circuit diagram showing a second embodiment of the system according to the invention.

The second embodiment of the system, according to the invention, will now be described with reference to FIG. 3. Those parts which are the same as the corresponding parts in FIG. 1 are designated by like reference numerals and characters. Detailed description of such parts will not be repeated.

In this second embodiment, a portion of the output signal of the preamplifier 18 is supplied, by way of an amplifier 31, to the meter 17. For this reason, the half mirror 13 and the photoelectric transducer 15 (shown in FIG. 1 in the preceding embodiment) are unnecessary. One terminal of the variable resistor R6 is grounded. The other terminal is connected to the emitter of the transistor Q1 and to a variable resistor R7. Furthermore, the junction between the above named parts is grounded through a capacitor C4. The variable resistor R7 is connected to the —B terminal 20.

Figure 4A:
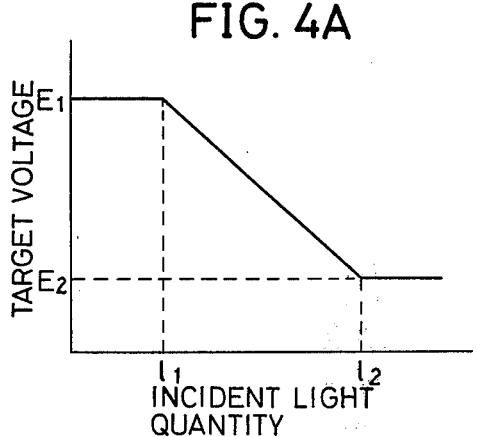
FIGS. 4A and 4B are graphs respectively indicating variations of target voltage and the output level of a preamplifier, with incident light quantity, for a description of the operation of the circuit illustrated in FIG. 3.

Similarly, as in the preceding first embodiment, the output signal of the preamplifier 18 passes through the resistor R5. After its voltage is higher than a voltage determined by the capacitors C2 and C1, the diodes D2 and D1, and the variable resistor R6 peak rectify the output signal. The rectified signal is supplied through the resistor R4 to the base of the transistor Q1. When the output signal level of the preamplifier 18 is lower than a voltage determined by the variable resistor R6, the transistor Q1 is nonconductive. Through the resistor R3 and other components, the target voltage of the camera tube 14 is made the predetermined voltage E1. Furthermore, when the quantity of incident light becomes greater than $l1$, and the output signal level of the preamplifier 18 is higher than a voltage determined by the variable resistor R6, the transistor Q1 becomes conductive. As a consequence, the target voltage of the camera tube 14 decreases as indicated in FIG. 4A. The output signal level of the preamplifier 18 is controlled so that it becomes constant.

Figure 4B:
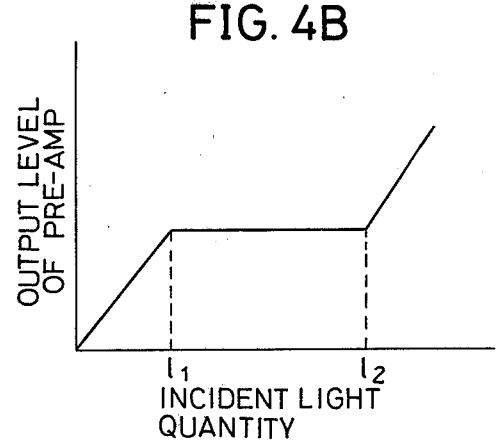

Furthermore, transistor Q1 is saturated since a positive voltage is being supplied to the emitter of the transistor Q1 through the variable resistor R7, when the voltage which is peak rectified and supplied to the base of the transistor Q1 exceeds a predetermined value. Consequently, as indicated in FIG. 4A, if the quantity of incident light increases, exceeding the specific light quantity $l2$, the target voltage of the camera tube 14 is held as it is at the predetermined voltage E2, and it does not become lower than this level. The relationship between the quantity of incident light and the output signal level of the preamplifier 18 becomes as indicated in FIG. 4B. That is, when the quantity of incident light is between light quantities $l1$ and $l2$, the output signal level is constant. As the quantity of incident light increases above the predetermined light quantity $l2$, the output signal level increases proportionally thereto.

Accordingly, the pointer of the meter driven by the output signal of the preamplifier does not rotate while the incident light quantity is in the range of light quantity $l1$ to $l2$. When the incident light quantity exceeds the light quantity $l2$, the pointer moves and enters its indication region. Thus, the camera operator is informed that the incident light quantity has become excessive, and thereupon he manually operates the iris mechanism.

Figure 5:
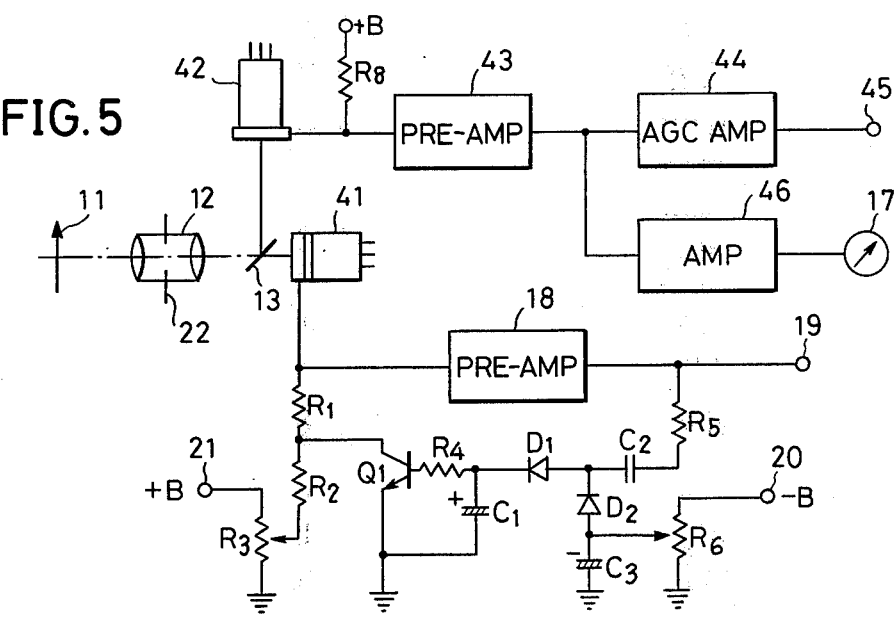
FIG. 5 is a circuit diagram showing a third embodiment of the system according to the invention.

A third embodiment of the system of the present invention will now be described with reference to FIG. 5. Those parts which are the same as corresponding parts in FIG. 1 are designated by like reference numerals and characters. Detailed description of such parts will not be repeated.

The instant embodiment illustrates an embodiment of the system of the invention using a two-tube type color camera.

The light from the object 11 which has passed through the camera lens 12 is divided into two light paths by the half mirror 13 and is projected to a camera tube 41 for chrominance signals and to a camera tube 42 for luminance signals.

A modulated chrominance signal is produced as output by the camera tube 41 for chrominance signals and supplied to the preamplifier 18. The target voltage of the camera tube 41 is controlled by the ALC circuit, similarly as in the aforedescribed first embodiment. The characteristic of the target voltage, with respect to the incident light quantity of the camera tube 41, is similar to that indicated in FIG. 2A. The characteristic of the output signal level, with respect to the incident light quantity of the preamplifier 18, is similar to that indicated in FIG. 2B.

The output signal of the camera tube 42 for luminance signals is amplified by a preamplifier 43. The signal is then supplied to a gain-control amplifier 44 and an amplifier 46. The characteristic of the output signal, with respect to the incident light quantity of the preamplifier 43, becomes as indicated by full-line curve I in FIG. 6A. Here, since a large quantity of a beam current is flowing through the camera tube 42 for luminance signals, a large range of correspondence can be utilized between the incident light quantity and the signal output of the camera tube.

Figure 6A:
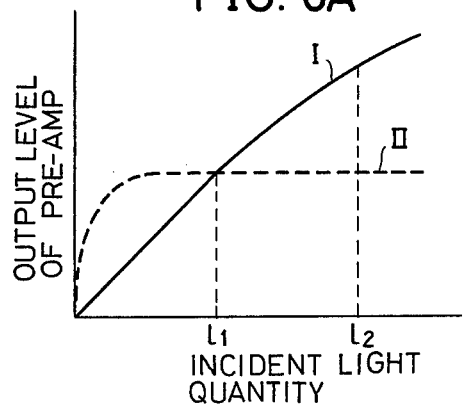
FIGS. 6A and 6B are graphs respectively indicating variations in the output level of a preamplifier for luminance signals and signal outputs of camera tubes for luminance signals and chrominance signals with incident light quantity, for a description of the operation of the circuit illustrated in FIG. 5.

Accordingly, the output signal of the preamplifier 43 is level controlled by the gain-control amplifier 44 and is sent out as a characteristic signal indicated by the intermittent-line curve II in FIG. 6A. As a result, the level of the luminance signal obtained from a luminance signal output terminal 45 becomes constant.

The signal amplified by the amplifier 46 is supplied to actuate the meter 17, which is provided within a viewfinder. The pointer of the meter 17 moves with substantially linear relationship in accordance with the incident light quantity. Any increase in the incident light quantity in excess of the predetermined light quantity $l2$ is readily detected by observing the movement of the pointer.

Figure 6B:
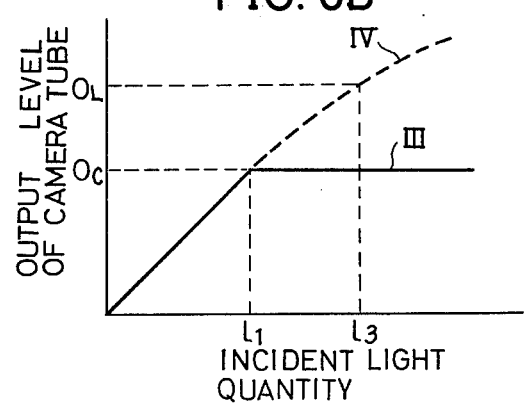

The output signal characteristics of the camera tube 41 for chrominance signals and of the camera tube 42 for luminance signals with respect incident light quantity are respectively indicated by the full-line curve III and intermittent-line curve IV in FIG. 6B. With regard to the camera tube 41 for chrominance signals, the output level of the camera tube 41 becomes constant (Oc), as a result of the ALC operation, when the incident light quantity exceeds the specific quantity $l1$, as indicated by the full-line curve III. As a result of this ALC operation, the beam current applied to the camera tube 41 for chrominance signals can be made to be relatively small. For this reason the modulation degree characteristic is good. Moreover, chrominance signals can be obtained which are advantageous with respect to shading.

With regard to the camera tube 42, for luminance signals, the luminance signal output increases in accordance with the $\gamma$ characteristic with respect to the incident light quantity, as indicated by intermittent-line curve IV in FIG. 6B. The beam current of the camera tube 42 for luminance signals is selected at a specific value which is amply large. The output signal of this camera tube 42 is automatically gain controlled, as mentioned above, and is constant. In the same figure, the incident light quantity $l3$, with respect to a luminance signal output OL, is a maximum incident light quantity to which the above set forth automatic gain control system can be applied. In general, this incident light quantity $l3$ is less than the specific light quantity $l2$.

Accordingly, this incident light quantity $l3$ is detected by means of the meter 17, whereupon the incident light quantity is adjusted by manually operating the iris mechanism.

A fourth embodiment of the system of the invention will now be described with reference to FIG. 7. Those parts which are the same as corresponding parts in FIGS. 1 and 5 are respectively designated by like reference numerals and characters. Such parts will not be described again in detail.

Light from the picked up object 11 passes through the camera lens 12, is divided into two light paths by the half mirror 13, and is projected to the camera tube 41 for chrominance signals and to a half mirror 51 for light path division. The light thus divided by the half mirror 51 is projected to the camera tube 42 for luminance signals and to the photoelectric transducer 15.

In accordance with the instant embodiment, in the two-tube type color camera, one portion of the incident light to the camera tube 42 for luminance signals is introduced as incident light into the photoelectric transducer 15. The output signal is used to actuate the meter 17.

With respect to the camera tube 42 for luminance signals, there is provided an ALC circuit which is similar to the ALC circuit provided in association with the camera tube 41 for chrominance signals.

The output signal of a preamplifier 54 passes through a resistor R11. After being peak rectified by capacitors C11 and C12 and a diode D11, the signal is supplied through a resistor R13 to the base of a transistor Q2. Then, if the incident light quantity to the camera tube 42 is appropriate, the transistor Q2 becomes nonconductive. The target voltage of the camera tube 42 is held at a constant value. On the other hand, as the incident light quantity increases to an extent such that the camera tube 42 can no longer hold its standard image pickup state, the transistor Q2 becomes conductive. The target voltage of the camera tube 42 decreases with increasing incident light quantity.

A fifth embodiment of the system, according to the present invention, will now be described with reference to FIG. 8. Those parts which are the same as corresponding parts in FIG. 7 are designated by like reference numerals and characters. Detailed description of such parts will be omitted.

The junction point between the diode D12 and the resistor R13 is connected through a resistor R21 to the base of the transistor Q1 associated with the camera tube 41 for chrominance signals. A variable resistor R22 is connected between the emitter of the transistor Q1 and the ground. Accordingly, a voltage, which is the same as that impressed through the resistor R13 on the transistor Q2, is impressed through the resistor R21 on the base of the transistor Q1. As a result, the transistor Q1 becomes conductive and nonconductive, together with the transistor Q2. The setting of the time instant at which the transistor Q2 becomes conductive is accomplished by adjusting the variable resistor R22. By varying the resistance value of this variable resistor R22, the loop gain of the open-loop control of the chrominance signal system is varied.

Figure 7:
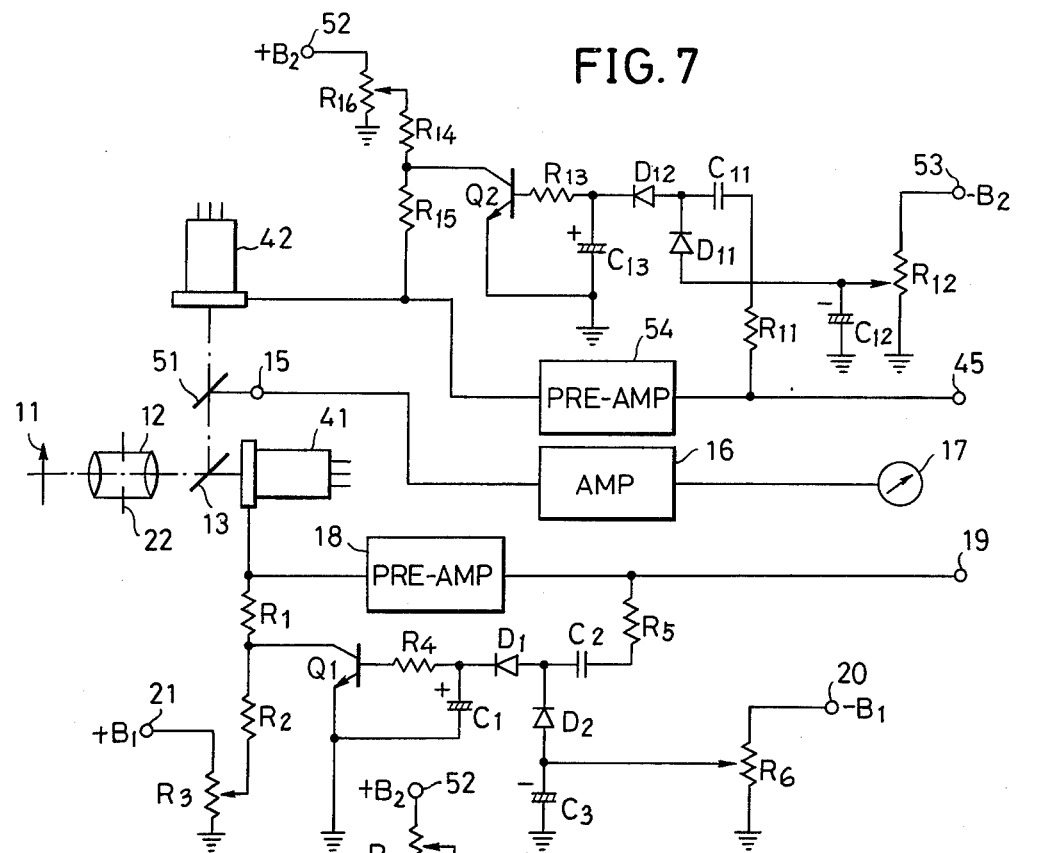
FIG. 7 is a circuit diagram showing a fourth embodiment of the system according to the invention.
Figure 8:
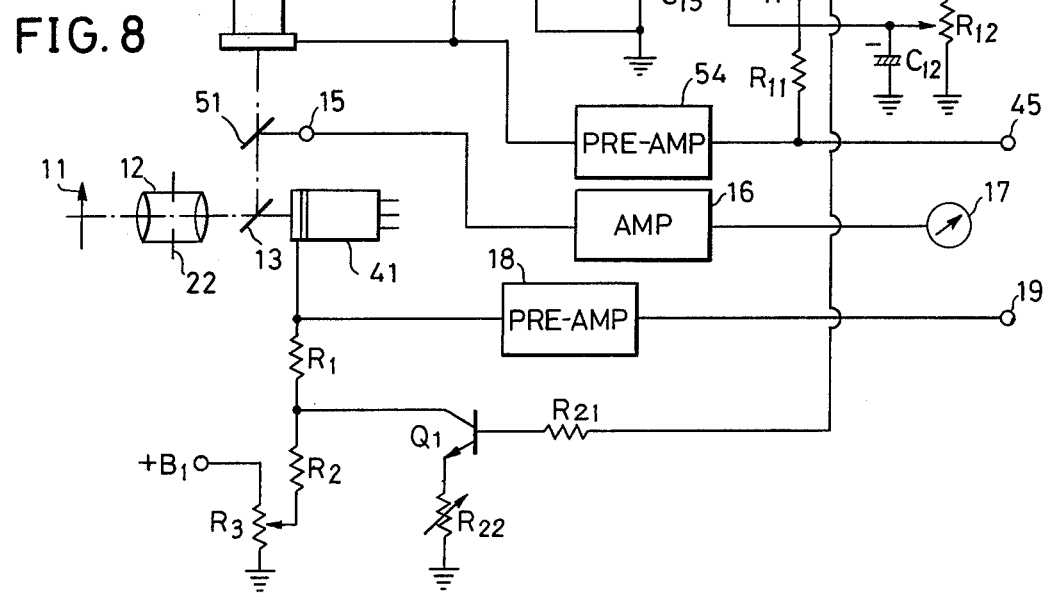
FIG. 8 is a circuit diagram showing a fifth embodiment of the system of the invention.

By the instant embodiment, the circuit becomes simpler than that of the embodiment illustrated in FIG. 7.

Figure 9:
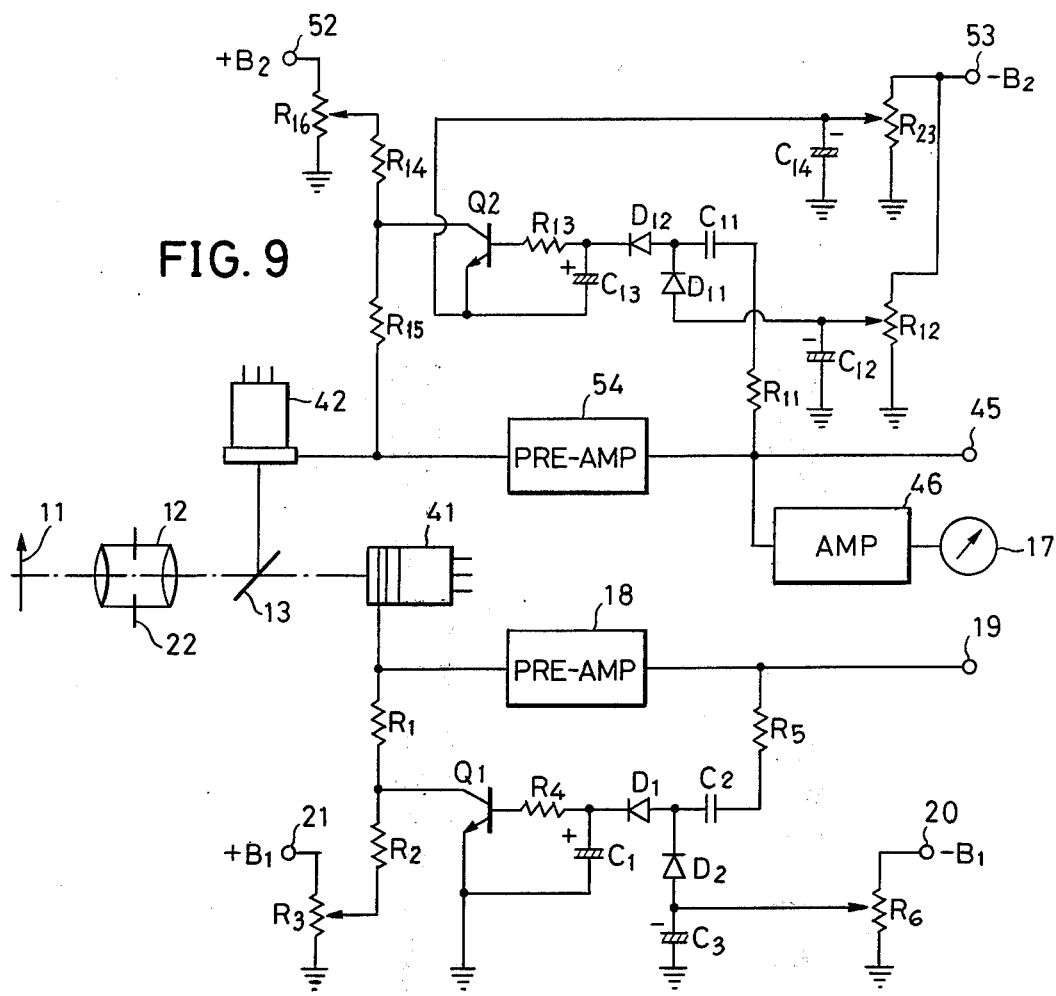
FIG. 9 is a circuit diagram showing a sixth embodiment of the system of the invention.

A sixth embodiment of the system of the invention is illustrated in FIG. 9. Those parts which are the same as corresponding parts in FIGS. 1, 5, and 7 are designated by like reference numerals and characters. Detailed description of such parts will not be repeated.

A portion of the output signal of the camera tube 42 for luminance signals passes through the preamplifier 54, is amplified by the amplifier 46, and then supplied to the meter 17.

The ALC circuit comprising the resistors R1 through R6, capacitors C1, C2, and C3, diodes D1 and D2, and the transistor Q1 is associated with the camera tube 41 for chrominance signals. Since this ALC circuit is the same as the ALC circuit associated with the camera tube 41 for chrominance signals, in the embodiments illustrated in FIGS. 5 and 7, it will not be described again.

Furthermore, the ALC circuit comprising the resistors R11 through R16 and R23, capacitors C11 through C14, diodes D11 and D12, and the transistor Q2 is associated with the camera tube 42 for luminance signals. This ALC circuit is substantially the same as the ALC circuit comprising resistors R1 through R7, capacitors C1 through C4, and diodes D1 and D2. The transistor Q1 is associated with the camera tube 14 in the embodiment illustrated in FIG. 3, and the description thereof will be omitted.

Figure 2B:
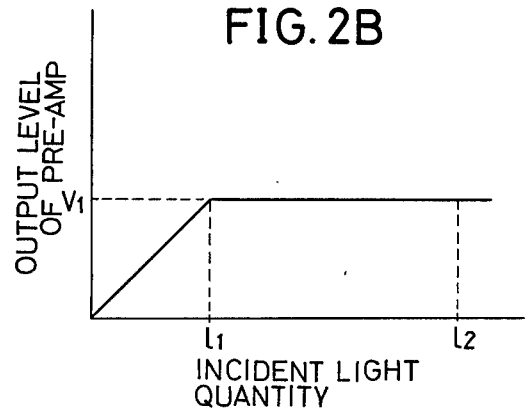

Accordingly the characteristic of the target voltage of the camera tube 41 for chrominance signals, with respect to the incident light quantity, becomes as indicated in FIG. 2A. The characteristic of output signal level of the preamplifier 18 with respect to the incident light quantity becomes as indicated in FIG. 2B. Furthermore, the target voltage characteristic of the camera tube 42 for luminance signals and the output signal level characteristic of the preamplifier 54, both with respect to the incident light quantity, become as indicated in FIGS. 4A and 4B, respectively.

Therefore, the pointer of the meter 17 does not move when the incident light quantity is in the range from $l1$ to $l2$. The pointer moves in the range above the light quantity $l2$. For this reason, when the incident light quantity exceeds $l2$, it can be readily detected.

Figure 10:
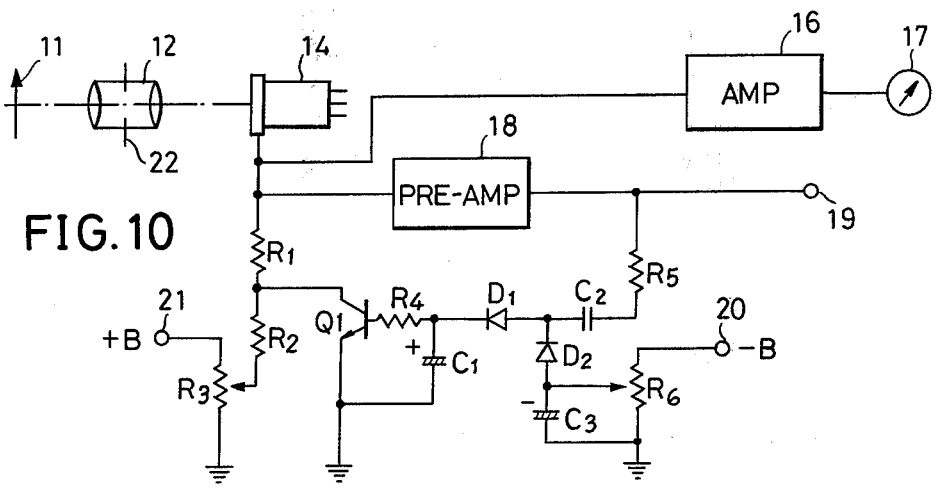
FIG. 10 is a circuit diagram showing a seventh embodiment of the system of the invention.

A seventh embodiment of the system according to the invention is illustrated in FIG. 10. Those parts which are same as corresponding parts in FIG. 1 are designated by like reference numerals and characters. Detailed description of such parts will not be repeated.

In this seventh embodiment, the half mirror 13 and the photoelectric transducer 15, as shown in FIG. 1, are not used. The target voltage of the camera tube 14 is impressed on the meter 17. With a decrease in the target voltage, the indicated value of the meter 17 also decreases. When this indicated value becomes less than thhe predetermined value, the second excessive incident light quantity can be detected.

Similarly, while not shown in the drawings, the pointer of the meter 17 may be moved in response to the target voltage, respectively in each of the above described embodiments, as modifications thereof.

In each of the above described embodiments of the system according to the present invention, the meter 17 is installed within the viewfinder of the color camera. However, it may be installed in another position of the color camera. Furthermore, instead of a meter, a lamp may be adapted to light. In still another alternative modification, a meter, lamp, or the like indicating means is not used. Excessive incident light quantity is detected by observing the picture of a monitor picture screen within the viewfinder and detecting a uniform whitening of the light parts of the picture, for example.

Further, this invention is not limited to these embodiments. Many various variations and modifications may be made without departing from the scope and spirit of the invention.

What is claimed is:

1. In a color television camera having a camera tube for picking up an image of incident light reflected from an object and for producing output signals responsive to the image of the object, the levels of said output signals varying in accordance with the incident light quantity when a constant target voltage is used, said camera comprising a system for disposal of excessive incident light quantity comprising:
    means for impressing a voltage on a target of the camera tube;
    control means responsive to the incident light quantity for automatically controlling said voltage impressing means to hold constant the target voltage when the incident light quantity is less than a first predetermined light quantity and to reduce the target voltage below said constant voltage to hold constant the level of the output signal of the camera tube when the incident light quantity is greater than said first predetermined light quantity;
    detection means for detecting when the incident light quantity on the camera tube exceeds a second predetermined quantity, which is greater than the first predetermined light quantity to such an extent that the resulting deterioration of the picked-up picture exceeds a practical allowable limit despite the operation of the control means;
    indication means responsive to the output of said detection means for indicating to an operator of the camera that the incident light quantity to the camera tube exceeds the second predetermined light quantity; and
    an iris mechanism controlled by the operator and located in the optical path followed by the incident light reaching the camera tube, said iris mechanism being operated only when the indicator means indicates that the incident light quantity exceeds the second predetermined light quantity, said iris operation reducing the incident light quantity to a value which is less than said second predetermined light quantity.

2. A system for disposal of excessive incident light quantity as claimed in claim 1 in which said detection means and indication means comprises light division means in the optical path of the camera tube for dividing out a portion of the incident light, photoelectric transducing means for converting the divided out incident light portion into an electrical signal, and means responsive to said electrical signal for indicating the incident light quantity.

3. A system for disposal of excessive incident light quantity as claimed in claim 1 in which said control means maintains the voltage impressed on the target at another constant voltage which is less than said constant voltage when the incident light quantity is in a range which is greater than said second predetermined light quantity; said indication means giving an indication of the level of the output signal of the camera tube; and said indication means does not vary the indication when said control means is holding the target voltage below a constant voltage, and said output signal level is constant and varies the indication in accordance with the variation of the output signal level responsive to variations of the incident light quantity when the control means is holding the target voltage at said other low constant voltage.

4. A system for disposal of excessive incident light quantity as claimed in claim 1 in which said detection means and indication means comprises means for indicating the target voltage on said camera tube.

5. In a color television camera having a camera tube for chrominance signals and a camera tube for luminance signals which receives incident light from an object and respectively produces a chrominance output signal and a luminance output signal responsive to the image of the object, the levels of said output signals varying in accordance with the incident light quantity when the target voltage is constant, a system for disposal of excessive incident light quantity comprising:
  first and second voltage impressing means for respectively impressing a voltage on the camera tubes for chrominance and luminance signals;
  control means responsive to the incident light quantity for automatically controlling said first voltage impressing means to hold constant the target voltage when the incident light quantity reaching the camera tube for chrominance signals is less than a first predetermined light quantity, said control means reducing the target voltage below said constant voltage to hold constant the level of the output signal of the camera tube for chrominance signals when the incident light quantity is greater than said first predetermined light quantity;
  detection means for detecting when the incident light quantity reaching the camera tube for chrominance signals exceeds a second predetermined quantity which is greater than said first predetermined light quantity by an amount which results in a deterioration of the camera pickup picture, whereby said second quantity exceeds a practically allowable limit despite the operation of said control means;
  indication means responsive to the output of said detection means for indicating to an operator of the camera when the incident light quantity to the camera tube exceeds the second predetermined light quantity; and
  an iris mechanism controlled by the operator and located in the optical path followed by the incident light reaching both of said camera tubes, said iris mechanism being operated only when the indicator means indicates that the incident light quantity exceeds the second predetermined light quantity, said iris reducing the incident light quantity to a value which is less than said second predetermined light quantity.

6. A system for disposal of excessive incident light quantity as claimed in claim 5 in which said indication means comprises means for indicating when there is an output signal from said camera tube for luminance signals.

7. A system for disposal of excessive incident light quantity as claimed in claim 5 in which said indication means comprises means in the optical path to said camera tube for luminance signals for dividing out one portion of the incident light reaching said camera tube for luminance signals, photoelectric transducing means for converting said divided out incident light portion into an electrical signal, and means responsive to said electrical signal for indicating the incident light quantity.

* * * * *